United States Patent [19]

Landfield et al.

[11] Patent Number: 5,664,185

[45] Date of Patent: Sep. 2, 1997

[54] NAMESERVER ADMINISTRATION SYSTEM AND METHOD

[75] Inventors: Kent B. Landfield, Papillion; Roger L. Ferrel, Omaha, both of Nebr.

[73] Assignee: Sterling Commerce, Inc., Dallas, Tex.

[21] Appl. No.: 446,330

[22] Filed: May 22, 1995

[51] Int. Cl.$^6$ .................................................. G06F 17/30
[52] U.S. Cl. .................................................. 395/615
[58] Field of Search .................................................. 395/615

[56] References Cited

U.S. PATENT DOCUMENTS

| | | | |
|---|---|---|---|
| 5,142,622 | 8/1992 | Owens | 395/200.02 |
| 5,307,484 | 4/1994 | Baker et al. | 395/600 |
| 5,408,619 | 4/1995 | Oran | 395/325 |
| 5,410,648 | 4/1995 | Pazel | 395/700 |
| 5,432,932 | 7/1995 | Chen et al. | 395/600 |
| 5,483,468 | 1/1996 | Chen et al. | 364/551.01 |

*Primary Examiner*—Wayne Amsbury
*Attorney, Agent, or Firm*—Baker & Botts, L.L.P.

[57] ABSTRACT

A data communications management and nameserver administration system is provided that allows for the administration of a nameserver database (44) through the invocation of a nameserver administration system (46). In addition, a nameserver test system (48) is provided that provides for nameserver tool execution systems (130) and a tool configuration utility (128). A graphical nameserver query system (50) is provided that allows for the submission of nameserver queries to other nameserver system.

3 Claims, 7 Drawing Sheets

NAMESERVER ADMINISTRATION SYSTEM AND METHOD

TECHNICAL FIELD OF THE INVENTION

This invention relates in general to the field of data communications and network administration and more particularly to an improved nameserver administration system and method.

BACKGROUND OF THE INVENTION

The publicly accessible interconnection of computer networks which is commonly referred to as the "Internet" depends upon Internet protocol (IP) addressing to route data traffic between the various nodes of the Internet. These numeric addresses are not intuitive and, as such, more intuitive non-numeric host names are supported. Typically, a sender of information over the Internet will supply a host name to a program referred to as a "nameserver". The nameserver will first check a local database for the IP address associated with the host name. If the local nameserver does not have the appropriate address, the local nameserver will query other nameservers within the Internet which may, in turn, query other nameservers until finally a resolution of the host name is returned comprising the numeric IP address associated with the destination host name.

The management of a nameserver is critical to maintaining connectivity between the users dependent upon that nameserver. The management of a nameserver is complicated by the possibility of providing subdomains within a single name space and because of the necessity of providing redundant support in case a single nameserver is damaged or goes offline for some reason.

In the past, nameserver management has been limited to the direct command line manipulation of the nameserver database. The nameserver files that define the operation of a nameserver site are extremely numerous, interrelated and counterintuitive. As such, direct manipulation of a nameserver site is very complex and prone to error.

Accordingly, a need has arisen for an improved nameserver administration and management system that reduces the complexity of nameserver management and controls the possibility of errors from direct manipulation of nameserver files.

SUMMARY OF THE INVENTION

In accordance with the teachings of the present invention, a nameserver management system is provided that substantially eliminates or reduces disadvantages associated with prior systems and methods for the administration and management of nameserver systems.

According to one embodiment of the present invention, a nameserver management system is provided that operates on a firewall host system connected to a private network and operable to be connected to a public network. The nameserver management system is operable to generate a graphical user interface that includes operation buttons to allow for the manipulation of a nameserver database. In addition, the nameserver management system provides for viewing of the contents of the nameserver database and for the specification of search strings and the searching of the database to select and view particular records within the nameserver database.

According to an alternate embodiment of the present invention, a nameserver administration system is provided that comprises graphical user interfaces operable to allow a user of the nameserver administration system to test a local nameserver facility. According to an alternate embodiment of the present invention, a further interface is provided that enables a user of the system to extend queries to other nameserver systems in order to synchronize and update nameserver information among cooperating nameserver systems.

BRIEF DESCRIPTION OF THE DRAWINGS

A more complete understanding of the present invention may be acquired by referring to the Detailed Description in conjunction with the accompanying FIGUREs in which like reference numbers indicate like features and wherein.

DETAILED DESCRIPTION OF THE INVENTION

Figure 1:
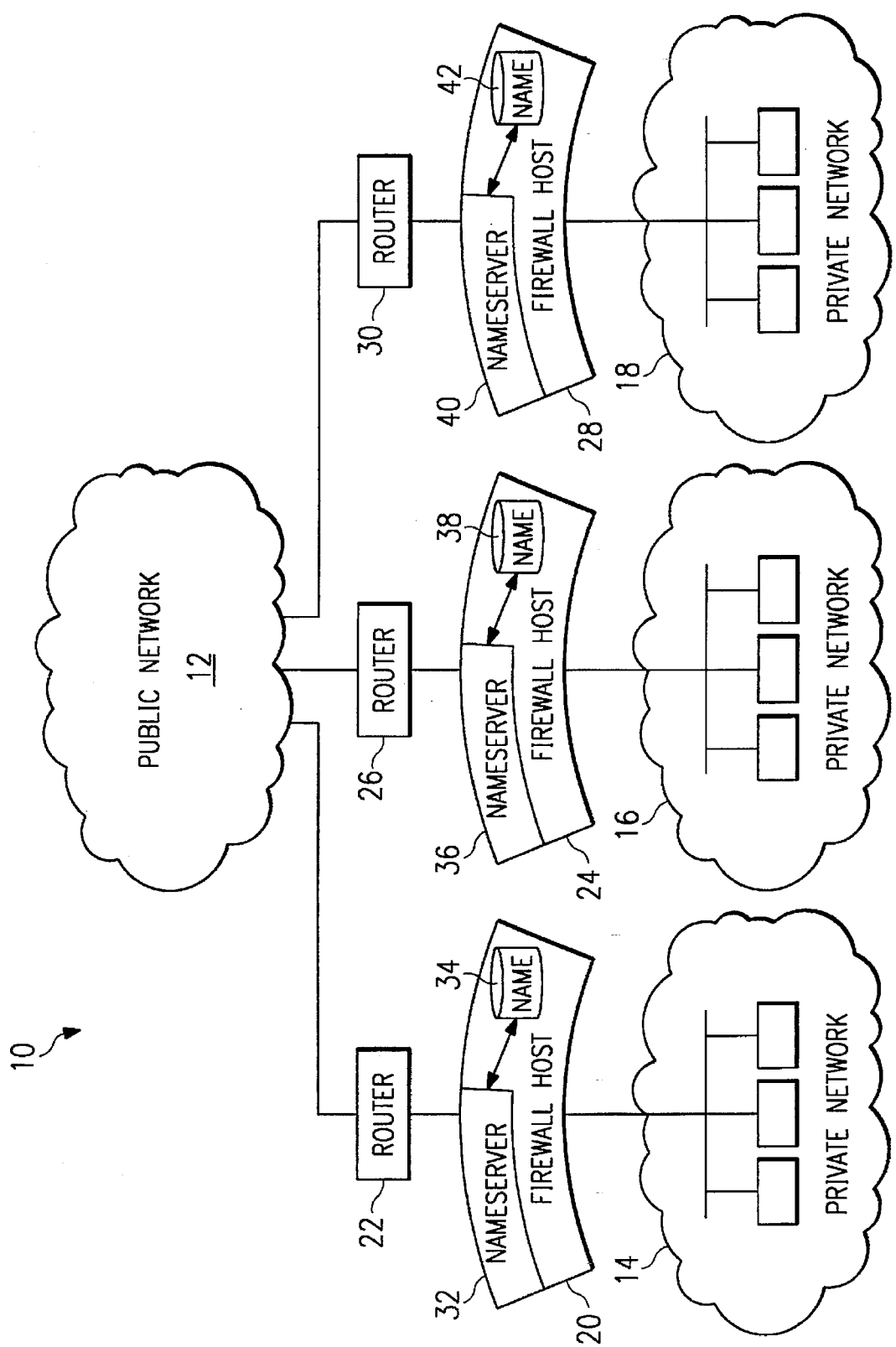
FIG. 1 is a block diagram of the operational environment of the nameserver administration system of the present invention.

FIG. 1 illustrates a data communications environment 10 which comprises a public network 12. Public network 12 may comprise the popularly known interconnection of computer networks which is referred to as the Internet. Public network 12 is connected to and serves as a medium of communication for a private network 14, a private network 16 and a private network 18. Private networks 14, 16 and 18 may comprise local or wide area networks associated with various organizations. Private network 14 is coupled to public network 12 through a firewall host system 20 and a route system 22. Similarly, private network 16 is coupled to public network 12 through a firewall host system 24 and a router system 26. Finally, private network 18 is coupled to public network 12 through a firewall host system 28 and a router system 30.

In general, routers 22, 26 and 30 provide connectivity to the public network 12 for the firewall host systems 20, 24 and 28. Firewall host systems 20, 24 and 28 provide for management of the interface between the private networks 14, 16 and 18 and the public network 12. For example, firewall host systems 20, 24 and 28 can provide strict access control to and from the private networks 14, 16 and 18 and the public network 12. In this respect, firewall host systems 20, 24 and 28 act as a hardware and software barrier for electronic mail traffic, Telnet access, FTP access, and other common Internet services, both inbound to the private networks 14, 16 and 18 and outbound from the private networks 14, 16 and 18 through the public network 12.

In addition, firewall host systems 20, 24 and 28 may also serve as platforms for electronic mail administration systems and system log management systems as described in copending U.S. patent application Ser. No. 08/446,213, now abandoned, entitled "System Log Management System" and U.S. patent application Ser. No. 08/445,855 entitled "Electronic Mail Management System", now U.S. Pat. No. 5,632, 011 assigned to the assignee of the present patent application, the disclosures of which are hereby incorporated by referenced.

Because the firewall host systems 20, 24 and 28 control all access to the private networks 14, 16 and 18, respectively. Each of the firewall host systems 20, 24 and 28 are primarily responsible for nameserver address resolution for the entirety of the domains and subdomains within each of the private networks 14, 16 and 18. For example, firewall host system 20 must provide primary nameserver address resolution to the rest of the public network 12 for the domain or namespace, including all of the subdomains that may be defined within private network 14.

In order to provide nameserver services to public network 12, firewall host system 20 comprises a nameserver system 32 which manages and interacts with a nameserver database 34. Similarly, firewall host system 24 comprises a nameserver system 36 which manages and interacts with a nameserver database 38. Finally, firewall host system 28 comprises a nameserver system 40 which similarly manages a nameserver database 42. Nameserver systems 32, 36 and 40 interact to provide updates to one another as changes in the nameserver databases 34, 38 and 42 occur by connecting through the public network 12.

The nameserver system is robust against a failure of a certain site because nameserver systems may act as secondary support systems for other primary nameserver systems. In this manner, nameserver system 36 might be the primary source for address resolution for the domain occupied by private network 16. In addition, nameserver 36 could act as a secondary support server for the domain occupied by private network 14. In this manner, if nameserver 32 should fail for any reason, nameserver 36 could provide nameserver address resolution services for message traffic intended for delivery in private network 14. This feature of the nameserver system provides for the ability to maintain nameserver operation even during faults within particular nameserver systems. However, this feature provides for much complexity in the structuring of the information stored by each nameserver system. Nameserver databases 34, 38 and 42 will contain primary information for address domains directly supported by nameservers 32, 36 and 40, respectively. In addition, nameserver databases 34, 38 and 42 may also contain secondary information with respect to other address domains.

In general, nameserver databases 34, 38 and 42 will contain information as to the mapping of IP addresses to the user and host name addresses associated with various domains. In addition, the nameserver systems 32, 36 and 40 will build caches of nameserver resolutions which have been used to deliver message traffic in the recent past. In this manner, a nameserver system such as nameserver system 32 can check nameserver database 34 prior to requesting the global nameserver system connected through public network to resolve an address. In this manner, nameserver database 34 will contain a core of information about the primary users it supports and information with respect to users of other domains for which it provides secondary services. In addition, information will be gradually added to nameserver database 34 as message traffic is routed from private network 14 and address resolutions are included in the nameserver cache. In the past, management of these separate sets of information has been extremely difficult due to the fragmented and counterintuitive method that the information is stored in nameserver files.

Figure 2:
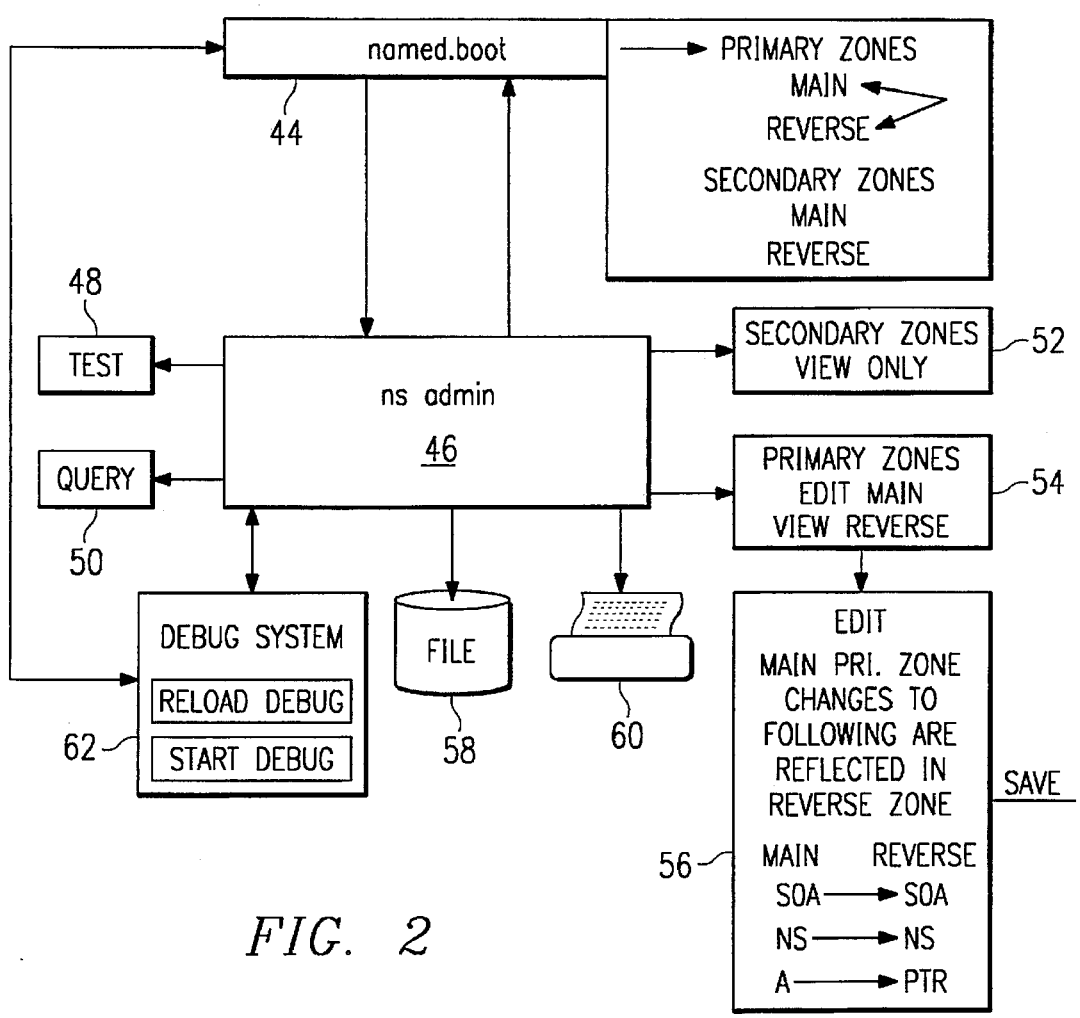
FIG. 2 is a block diagram illustrating the architecture of the nameserver administration system of the present invention.

FIG. 2 is a block diagram which illustrates the software architecture used in the present invention for administering the nameserver database. Referring to FIG. 2, a nameserver database which is located in a directory named.boot indicated at 44, contains database information about the primary zone name space and all secondary zone namespace. In addition, the nameserver database 44 includes both main and reverse information for the primary and secondary zones. The main information for a name space is the information which is accessed to perform the resolutions discussed previously. The reverse information for a name space comprises information that is queried by a destination facility to insure that the sending facility is actually who they say they are. As will be discussed herein, the reverse database information is also maintained automatically by the nameserver administration system of the present invention.

The nameserver database 44 is accessed by an nsadmin administration program 46. Administration program 46 is operable to transfer control to a test program 48 and a query program 50 which will be discussed more completely herein. The administration program 46 is operable to view the secondary zones through a secondary zone viewing process 52 shown in FIG. 2. In the example shown in FIG. 2, the nameserver database 44 is acting as a backup storage facility for another nameserver system. The database of the other nameserver system is reflected in the secondary zone information and accessed by the secondary zone viewing system 52. The information in the secondary zone database must be accessible to the person operating the administration system 46. However, the operator of the administration system 46 is not allowed to edit the secondary zone information directly using the secondary zone viewing system 52 to prevent conflicts between the secondary copy of the namespace database and the primary copy of the namespace database maintained by the primary nameserver system.

In contrast, the administration system 46 accesses a primary zone editing system 54 as shown in FIG. 2. The primary zone editing system 54 allows for the editing of the main portion of the nameserver database 44. In addition, the primary zone access system 54 allows for the viewing of the reverse information associated with the main information of the database 44. The reverse information is not directly accessible, but is generated automatically when the main information associated with each piece of reverse information is edited. In this manner, inconsistencies between the reverse information and the main information are eliminated. If special cases of reverse information are required, a user of the administration system may still access the command line editing capability to directly manipulate the reverse database files within database 44.

The primary zone access system 54 accesses an editing system 56 which allows for the changes to the start of authority, namespace, and address records within the main database of database 44. As shown in FIG. 2, a change in the start of authority record causes a change in the reverse start of authority record. Similarly, a change in the main namespace record causes a change in the reverse namespace record. Finally, a change in a main address records causes a change in the reverse PTR record. The administration system 46 interfaces with a file storage system 58 to save information to a disk or other mass storage media. In addition, the administration system 46 has access to a printer 60 to print information such as printouts of records within the nameserver database 44.

The administration system 46 accesses a debug system 62 which interfaces with the nameserver database 44 to provide for debugging of the database. Debugging can be provided at various debug levels so that a user of the administration system 46 can watch the database operate step by step if necessary to trace and correct problems within operation of the nameserver database 44. The administration system 46 controls the operation of the nameserver database 44 and is capable of starting and stopping the operation of the nameserver database 44 as well as reinitializing the database by reloading it. A reload operation will eliminate the local cache of address resolutions and will reinitialize the database to the initial values stored in the nameserver database 44. The administration system 46 is also capable of dumping the contents of the nameserver database 44 and the included cache of address resolutions into temporary storage so that the administration system 46 and especially primary zone viewer access system 54 can view the contents of the database.

Figure 3A:
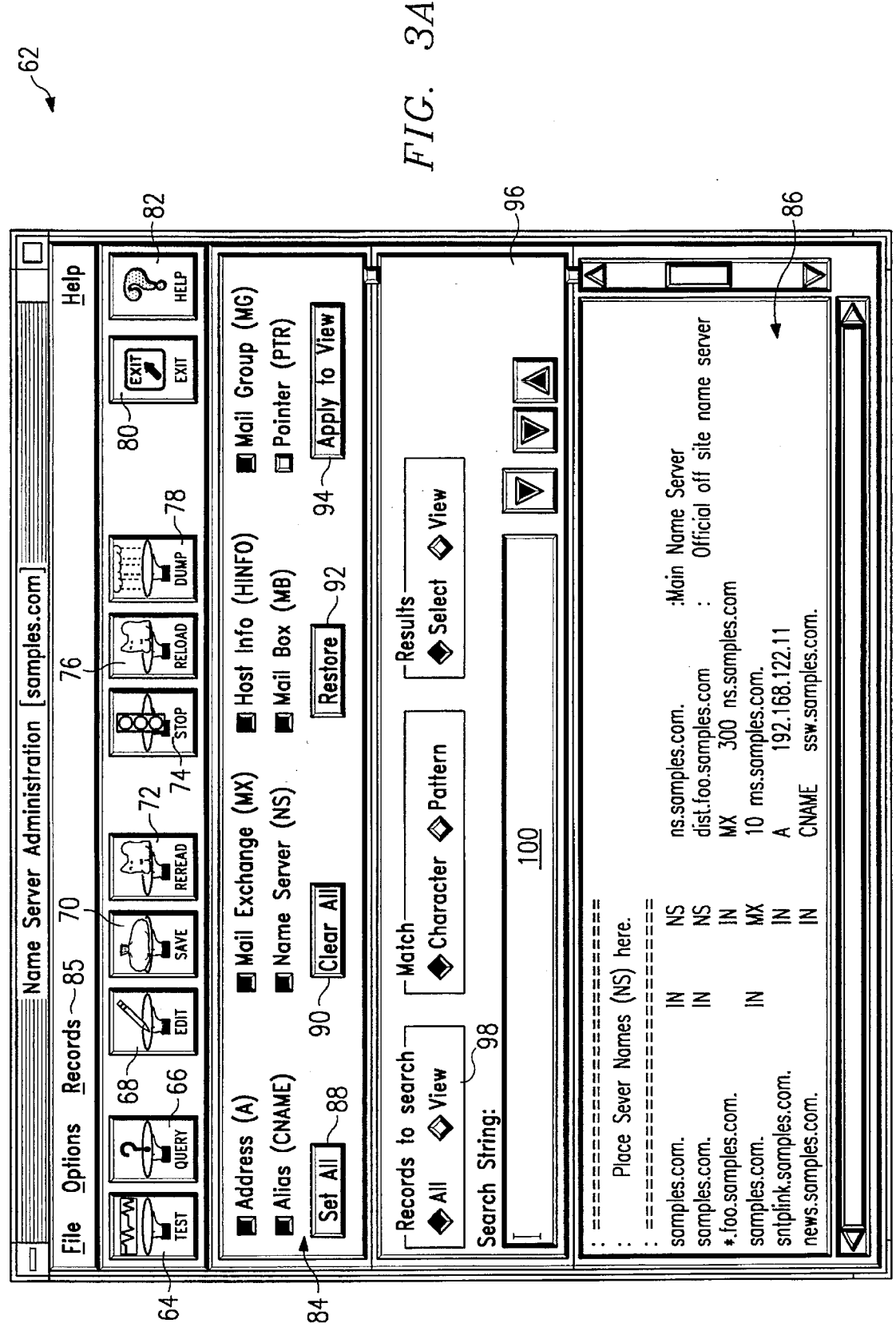
FIGS. 3A and 3B are illustrations of the graphical user interface of the nameserver administration system of the present invention.

FIG. 3a is an illustration of a graphical user interface indicated generally at 62 which is used by the administration system 46 to interface with the user. The test system 48 is accessed through a Test button 64 shown in FIG. 3a. Similarly, the query system 50 is accessed by actuating a Query button 66 shown in FIG. 3a. The operation of the test and query systems 48 and 50 will be discussed more completely herein.

An Edit button 68 is used to access the primary zone access system 54 and especially the editing system 56 described previously. A Save button 70 will secure all changes and write all changes using the editing system 56 into the database 44. A Reread button 72 will cause the editing system 56 to reread the database 44. A Start/Stop button 74 shown in FIG. 3a will toggle between the start and stop functions and will cause the operation of the nameserver database 44 to start and stop accepting requests for address resolution and performing the resolutions. A Reload button 76 shown in FIG. 3a will reinitialize the data that is used to perform address resolutions. In effect, the Reload button 76 will cause the nameserver database 44 to eliminate all local cache information and reinitialize the database to only the local information. A Dump button 78 will cause the local cache and initial information to be copied to a file. The Dump button 78 will also cause a dialog window to be shown which will include a viewing window so that the contents of the local cache and local information can be viewed. An Exit button 80 terminates the operation of the administration system 46 and a Help button 82 provides context sensitive help for users of the interface 62.

The interface 62 also includes a Records pull-down menu 85 which, when activated, allows the user of the administration system 46 to access templates for various records used in the database 44. These templates allow for the simple and efficient creation of new records to be placed in the database 44. Templates are provided for Address, Alias, Mail Exchange, Name Server, Host Info, Mailbox, Mail Group, Start of Authority records and for Comment lines. An Address records manages the record information that associates the name of a host machine and IP address. An Alias record manages the record information that associates an alias to the primary or canonical name given in an address record. A Mail Exchange record manages the record information that specifies where to send the mail for a particular domain, mail box, or mail group. A Name Server record manages the record information that specifies a machine that will act as a nameserver for the current zone. A Host Information record manages the record that specifies host information such as the type of central processing unit or operating system in use for an indicated host system. A Mailbox record manages record information that specifies a particular host system that will receive the mail for a given address. A Mail Group record manages the information that associates mailboxes to the name of a mailing list. A Start of Authority record comprises the first record in the database of a zone. The Start of Authority record specifies the zone owner, the host system that is the primary server for the zone, and the mail box responsible for maintaining the zone. Comment lines may be added to the database to provide information as to the structure of the database.

Interface 62 also comprises a resource selection area indicated generally at 84. The resource selection area 84 allows a user to select the various types of records which are displayed in a viewing area indicated generally at 86. Selections are available for Address, Alias, Mail Exchange, Name Server, Host Info, Mailbox, Mail Group and Pointer records. A Set All button 88 sets all of the resource selection toggles so that all records are viewed in viewer area 86. A Clear All button 90 clears all toggles. A Restore button 92 sets the toggles to reflect what is currently being viewed in the viewing window 86. An Apply to View button 94 changes the information viewed through viewer area 86 to reflect the current setting of the resource toggles in resource selection region 84.

Interface 62 also includes a search interface 96. The search interface 96 includes a records search selection area 98 which allows the user to select whether all of the records in the database are to be searched, or if only the records currently being viewed through viewer region 86 are to be searched. The user is also allowed to select between a character or a pattern search. In addition, the user can select whether to select or view the identified records in the database 44. A search string is entered in a search string entry window 100. The last ten search strings are stored and are accessible so that these search strings may be reused.

By accessing user preferences, the debug system 62 can be invoked. The debug level may be set through user preferences under the options pull-down menu through interface 62. The database 44 can then be started using the Start/Stop button 74. The results of the operations of the database will then be displayed and the results can be printed or saved to file. In addition, the administration system 46 allows for the results of the forced operation of the database to be searched using the identical search engine described with reference to search area 96 previously.

Figure 3B:
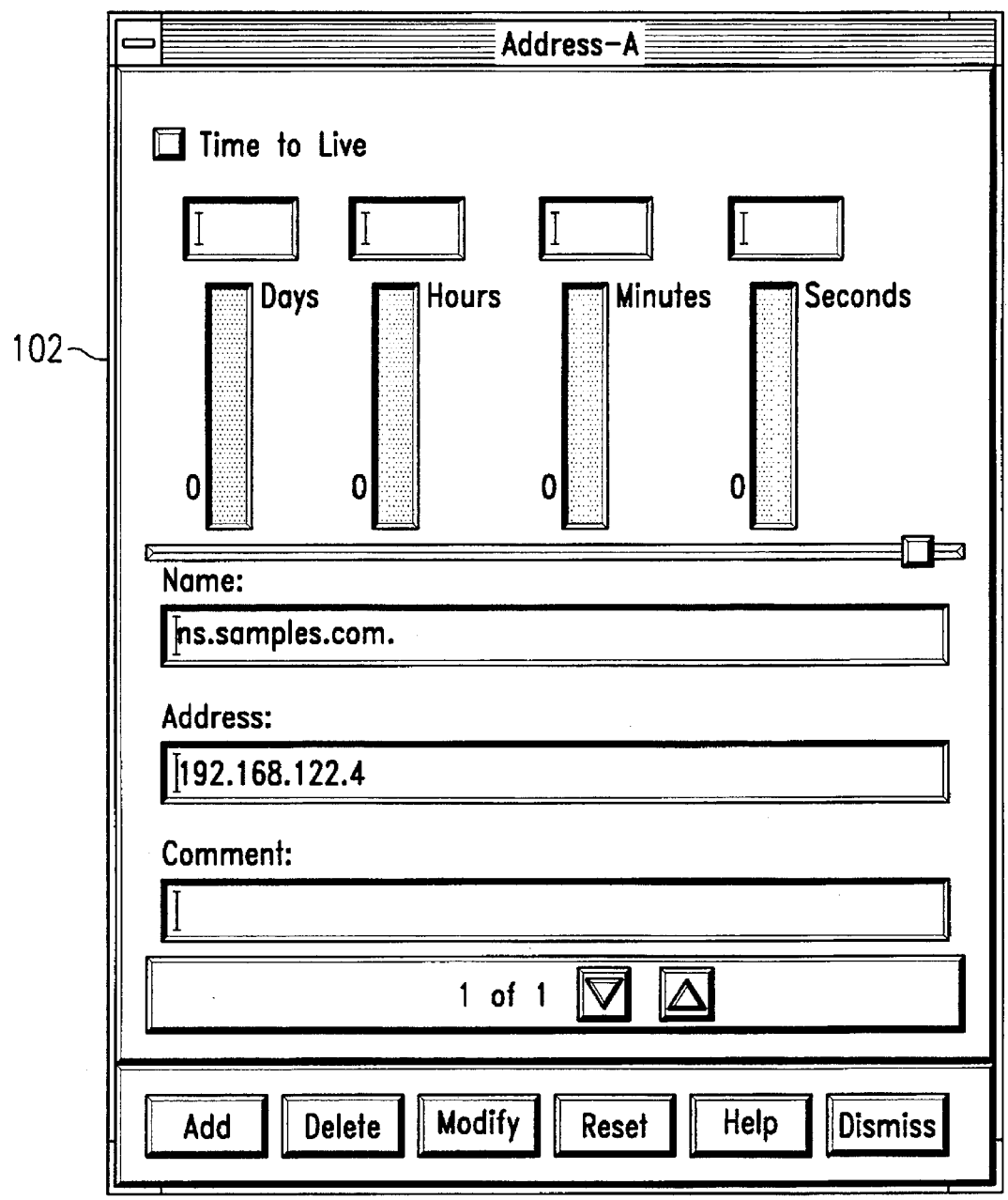

FIG. 3b illustrates an exemplary record template 102. The template 102 is an address template which includes sections to enter a time to live value, a name value, an address value and comments for the address record. The address template 102 also includes command buttons to add, delete or modify the record, to reset the template to gain access to help files in filling up the template, and to dismiss the template and return to other processing. The various records require the entry of different fields depending upon the type of record. For example, the address template 102 shown in FIG. 3b requires the entry of name information which specifies the canonical name for the machine. Address information is provided to specify the associated IP address that is unique to the machine in the name field. It also allows for optional comments to be added.

The start of authority record requires the entry of owner information to specify the zone name for the start of authority. Server name information is entered to specify the full domain name for the machine that is the primary server for the start of authority zone. Mail box information is entered to specify where to send mail when there are questions or problems with the start of authority zone. Start of authority records also include time fields. For example, refresh information is provided to specify the amount of time the secondary server should wait before obtaining zone information again. Retry information is entered to specify the amount of time to wait before trying again to refresh the zone information after a prior refresh operation fails. Expire information is provided to specify the maximum amount of time that can elapse before the zone information is no longer valid. A minimum time to live information is provided to specify the minimum time to live value for all records.

As shown in FIG. 3b, the address record template 102 includes a time to live specification. A record can include a specific time to live that will override the minimum time to live value specified in the Start of Authority record. However, if no time to live value is specified for a record, the minimum time to live value from the Start of Authority record will be used for that record.

A Mail Exchange template includes a time to live field to specify an override value for the time to live. The Mail Exchange template also includes a mail for domain area which is used to specify the domain for the mail exchange. A send to machine field is used to specify the machine or see the mail for the specified domain. A priority designation specifies a priority value from 0 to 65535 that is associated with the machine.

The host information template also has a time to live entry field. In addition, the host information template provides a machine region to specify the canonical name of the machine that the machine is referencing. A CPU type field specifies CPU information for the named machine. An operating system field specifies the information about the operating system of the named machine.

An Alias template also includes a time to live designation region. A name field within the alias template is used to specify the primary or canonical name in the current zone. An alias field is used to specify another name for the machine previously specified in the name field.

A name server template specifies a machine that will act as a nameserver for the indicated domain. The name server template includes a time to live region described previously. In addition, a server region specifies the machine acting as the nameserver for the indicated domain. A domain region specifies the domain for which the server machine is acting as a nameserver. A comment region is also provided for additional comments.

The mail box template is used to specify the host machine to receive the mail for a given address. The mail box template includes a time to live region for specifying and overriding time to live value. Also, the mail box template provides a mail boxing group region to specify the name of the mail box. A host region is used to specify the machine to send the mail for the address mail box.

The mail group template specifies the mail boxes in a mailing list. The mail group template includes a time to live region. In addition, the mail group template includes a mail box region to specify a mail box to add to the mailing list. A mail group region specifies the name of the mailing list.

A pointer template includes a time to live region for specifying an override time to live for the pointer record. The pointer template also includes a name field for specifying an override time to live for the pointer record. The pointer template also includes a name field for specifying the canonical name of the machine. An inverse name field specifies the IP address for name and reverse ordering in reverse order followed by a designation of "inaddr.arpa."

The administration system 46 is configurable to provide for various user preferences to be reflected in the operation of system 46. For example, by effecting a user preference list, a user will be asked to confirm a variety of additions or deletions to the database 44 before these additions or deletions take place. In this way, accidental changes to the database 44 can be eliminated.

Figure 4:
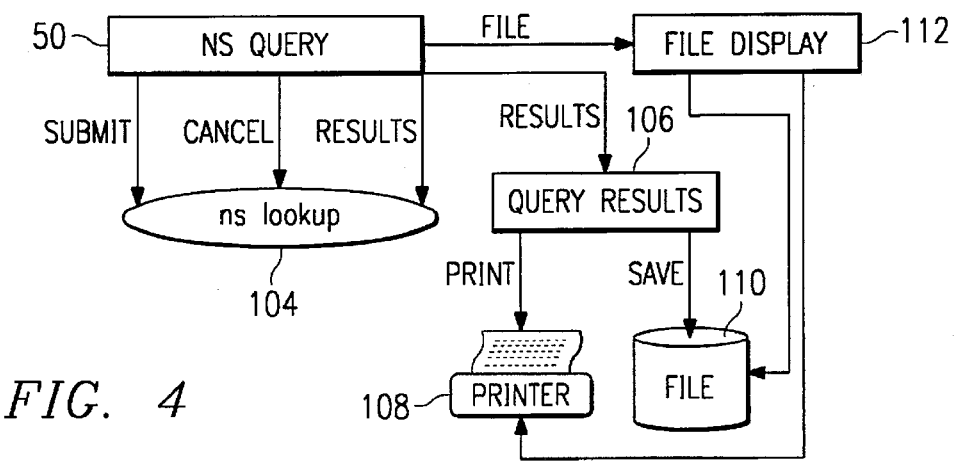
FIG. 4 is a block diagram illustrating the architecture of the nameserver query system of the present invention.

FIG. 4 illustrates the architecture of the query facility within the nameserver administration system of the present invention. As discussed previously, the query system 50 may be accessed from the administration system 46. The query system 50 acts as a graphical interface to the nslookup program 104 shown in FIG. 4. The nslookup program 104 is a conventional utility used in the Internet environment to ask for IP addresses, zone information, and additional resource record data on any nameserver and an internal network or through the public network 12. Historically, the nslookup program has been a command driven interface which is difficult to use. The query system 50 of the present invention provides a graphical interface to the conventional nslookup program 104 to greatly improve the operation and expedite the use of the nslookup program. The query system 50 submits queries to the nslookup program 104 and receives results back. In addition, the query system 50 can cancel queries as they are being processed. The query system 50 transmits the results of queries to a query result processor 106. The query result processor 106 receives the results and may send the results to a printer 108 or to file storage 110 may comprise a disk drive or similar mass storage media. The query system 50 also may send file information to a file display system 112. File display system 112 also has the option of printing information to the printer 108 or storing information on the file system 110.

Figure 5:
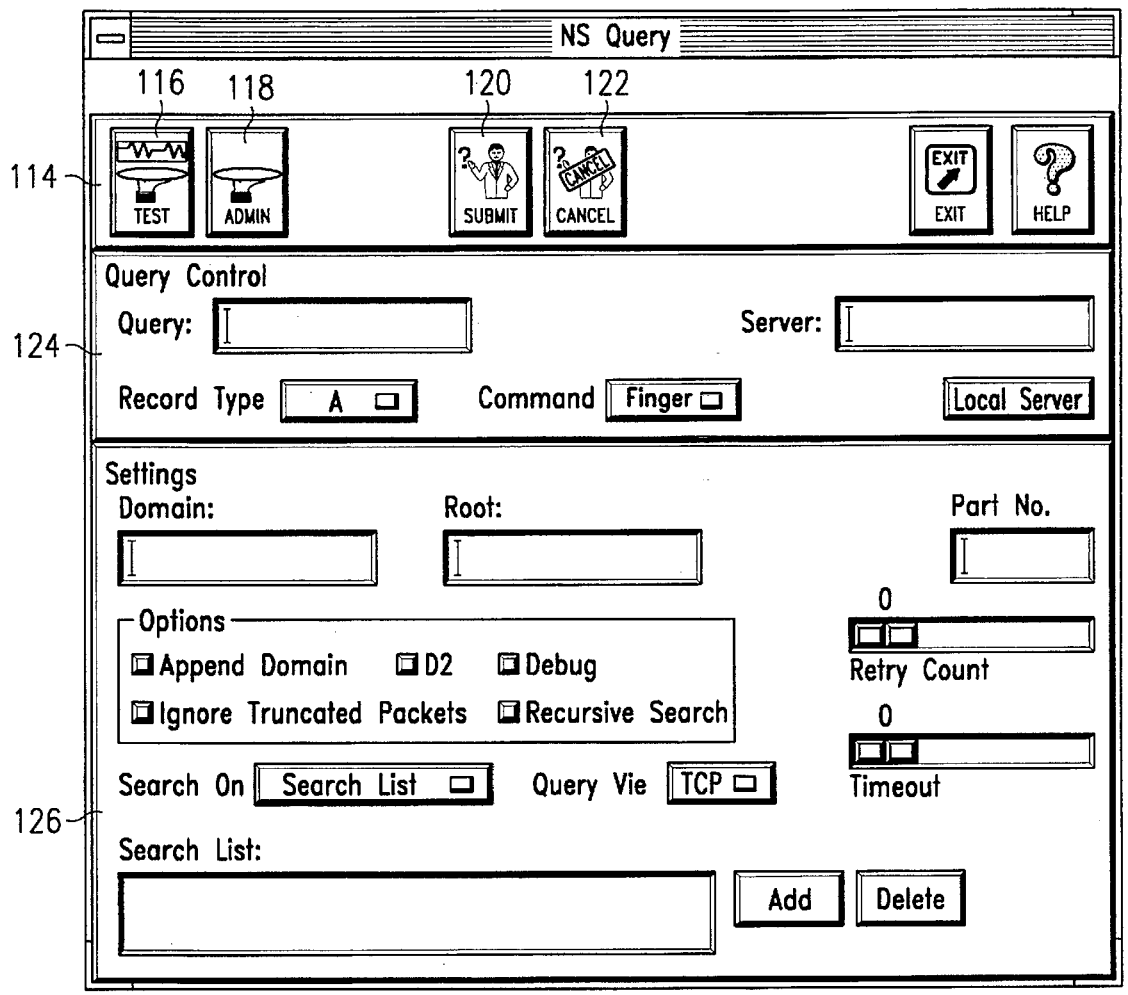
FIG. 5 is an illustration of the graphical user interface used in the nameserver query system of the present invention.

FIG. 5 is an illustration of a graphical user interface 114 which is used by the query system 50 to solicit the required information and commands during the operation of query system 50. Interface 114 comprises a Test command button 116 which transfers operation to the nameserver test system which will be described herein. Interface 114 also comprises an Administration command button which returns program control to the administration system 46 described previously.

Interface 114 also comprises a Submit button 120 which submits the query specified in the remainder of the interface 114 to the nslookup program 104. A Cancel button 122 causes the query system 50 to submit a cancel command to the nslookup program 104 which will cancel all pending queries. Interface 114 also includes an Exit button and a Help button which operate as described previously.

Interface 114 comprises a query control section 124. The query control section 124 comprises a query window which is used to specify the zone, machine, file, or named process. In addition, the query control region 124 comprises a server window which is used to specify the server the system will pull information from when processing. A record type control is used to specify the resource record type to access during processing. The record type control is only active if the LS command is specified in the command option. Valid record types includes A, AXFR, CNAME, HINFO, MX, NS, PTR, SOA, STXT, UINFO, and WKS. The record types A, CNAME, HINFO, MX, NS, PTR and SOA have been described previously. The AXFR record specifies zone transfer requests. The TXT record specifies additional text string associated with a machine or zone. The UNIFO record specifies user information. The WKS record advertises the type of service to support by machine.

A Command button within query control region 124 specifies the command to invoke during processing. Valid commands include "finger", "lookup", "ls" and "view". The finger command allows you to obtain information on individuals and machines within the public network 12. The ls command performs a zone transfer of the desired resource records during processing. The lookup command performs the lookup of the desired record type on the machine specified in the query field. The view command displays sorted file information in a results dialog box responsive to the path name specified in the query field. A local server command returns the server specification to the default server. The interface 114 also includes a settings control region 126. Settings control region 126 includes a domain field which is used to specify the domain name to append. A route field is used to specified the route server. A port number field is used to specify which communication port is to be used. In addition, radio button options are included within region 126.

As shown in FIG. 5, an Append Domain radio button is used to append the current domain name to the end of a name that does not have a trailing period. A D2 radio button is used to display second level debug information. A Debug radio button is used to display the first level debug information. An Ignore Truncated Packets radio button causes the system to ignore any packets that are truncated. A Recursive Search radio button is used to specify recursive search to a higher server. Recursive searches will continue until the search reaches a root if necessary. Region 126 also comprises sliders which are used to specify retry count and timeout. The retry count specifies the maximum number of retries requiring a nameserver. The timeout specifies the amount of time in seconds elapses for the first retry.

Finally, region 126 includes a Search On setting which specifies where to search. The Search On setting can either be set to the search list or default domain. A Query Via option specifies the protocol to use for the query. The valid options for the Query Via include UDP and TCP. A Search List window contains a list of the items such as domain names that were last searched using the query system 50. Add and Delete command buttons are included to add and delete from the Search List.

Figure 6:
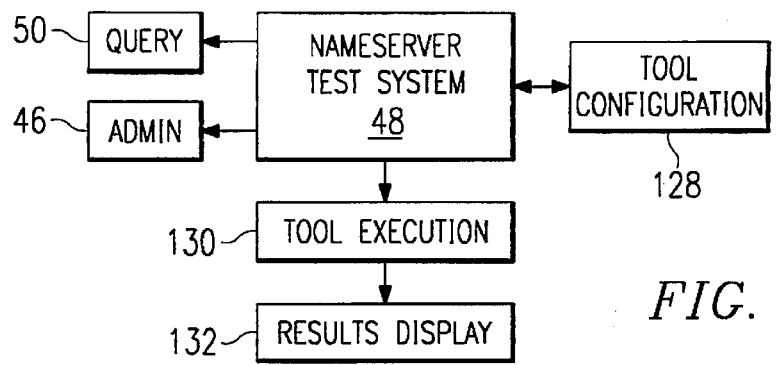
FIG. 6 is a block diagram of the architecture of the nameserver test system of the present invention.

The system of the prevent invention also includes a nameserver test system 48. FIG. 6 is a block diagram which illustrates the architecture of the test system 48. As described previously, the test system 48 allows for the quick transfer of control to the query system 50 or the administration system 46 if need be.

In general, the nameserver test system 48 allows the user to manage network testing tools. The nameserver test system 48 interacts with a tool configuration system 128. The tool configuration system 128 is used to retrieve new tools and to add them to the executable tool list.

The nameserver test system 48 also interacts with a tool execution system 130 which executes tools selected using the nameserver test system 48. The tool execution system then uses a results display system 132 to display the results of the test in either a standard results window or an xterm interactive shell.

Figure 7A:
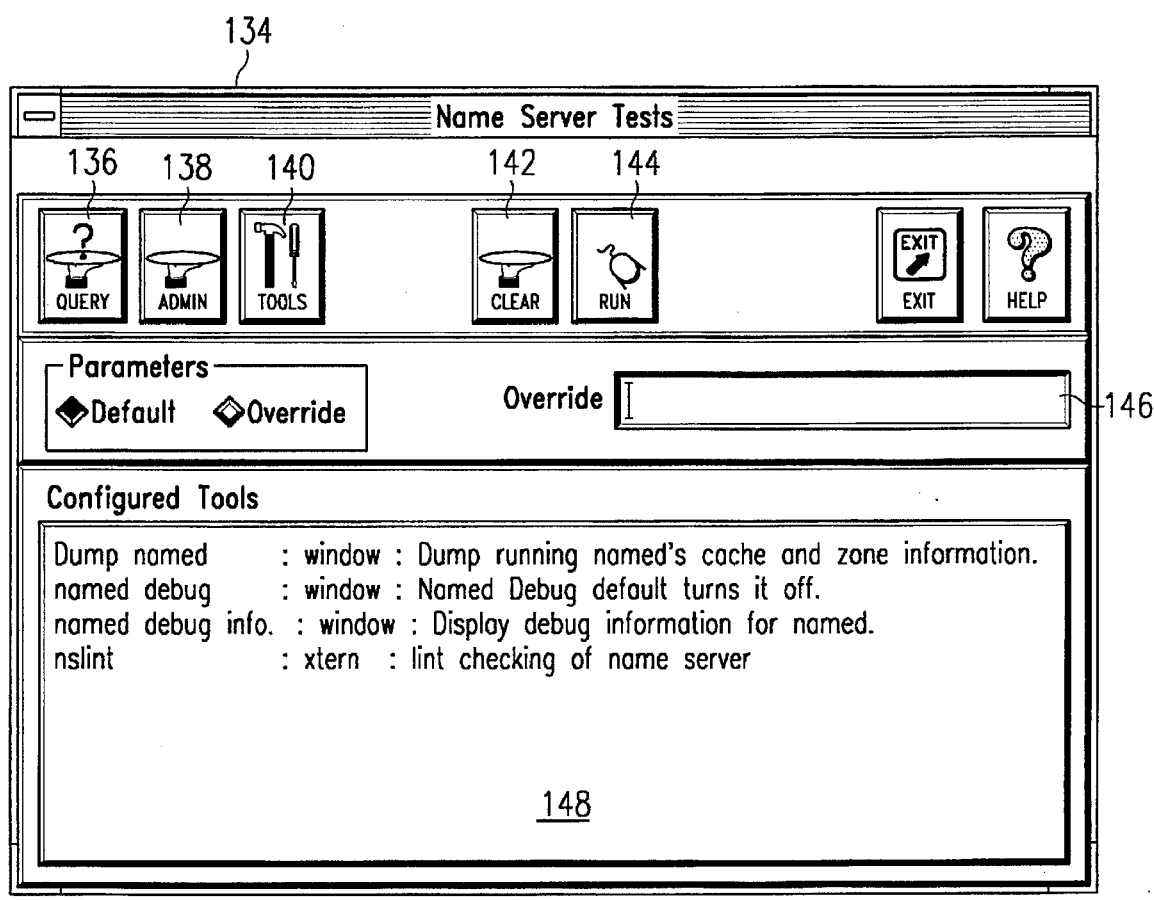
FIGS. 7A, 7B and 7C are illustrations of the graphical user interface used in the nameserver test system of the present invention.

FIG. 7a illustrates a graphical user interface 134 which is used by the nameserver test system 48 to interact with the user of the system 48. The interface 134 includes a Query command button 136 which returns program control to the query system 50. Similarly, an Administration command button 138 returns program control to the query system 50. Similarly, an Administration command button 138 returns program control to the administration system 46. A Tools command button 140 invokes the tool configuration system 128. Using the tool configuration system 128, a user may add, delete or modify tests. A Clear command 142 is used when in the tool configuration system 128 to clear items so that no tool is selected.

A Run command 144 is used to invoke the tool execution system 130. The selected text within the tool configuration window will be executed by the system 130. Exit and Help commands are also provided through interface 134. Interface 134 also provides radio buttons to select default or override parameters. An Override entry window 146 is used to supply parameters if the Override parameter button is selected. The interface 134 also comprises a display region 148 shown in FIG. 7a displays the configured tools which may be executed through tool execution system 130.

Figure 7B:
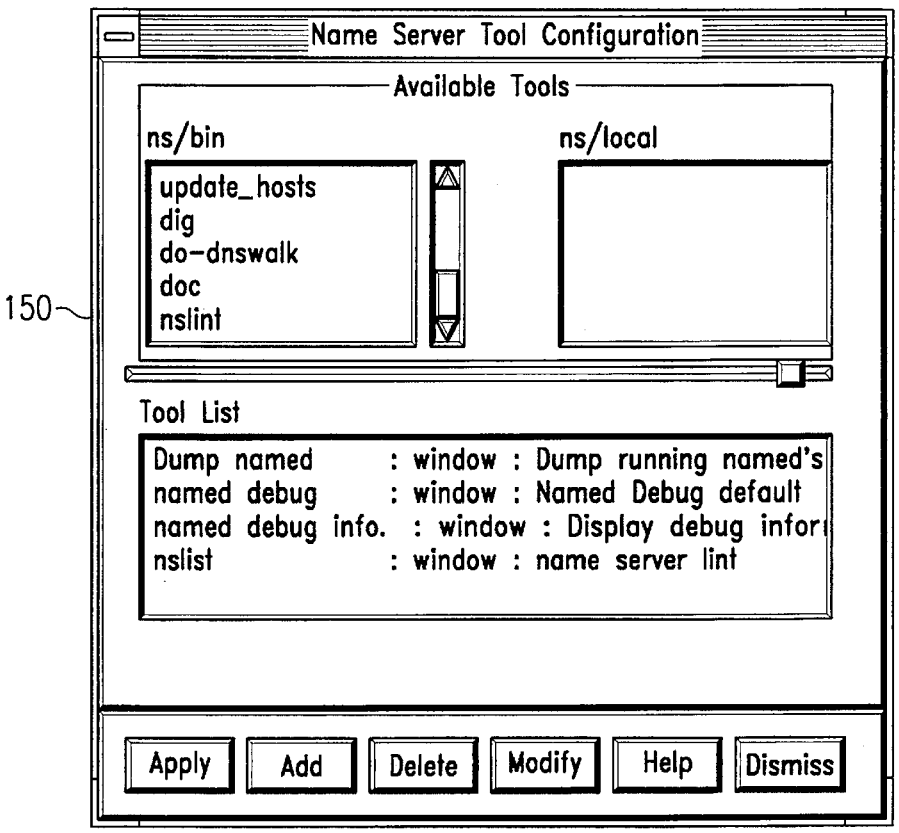
Figure 7C:
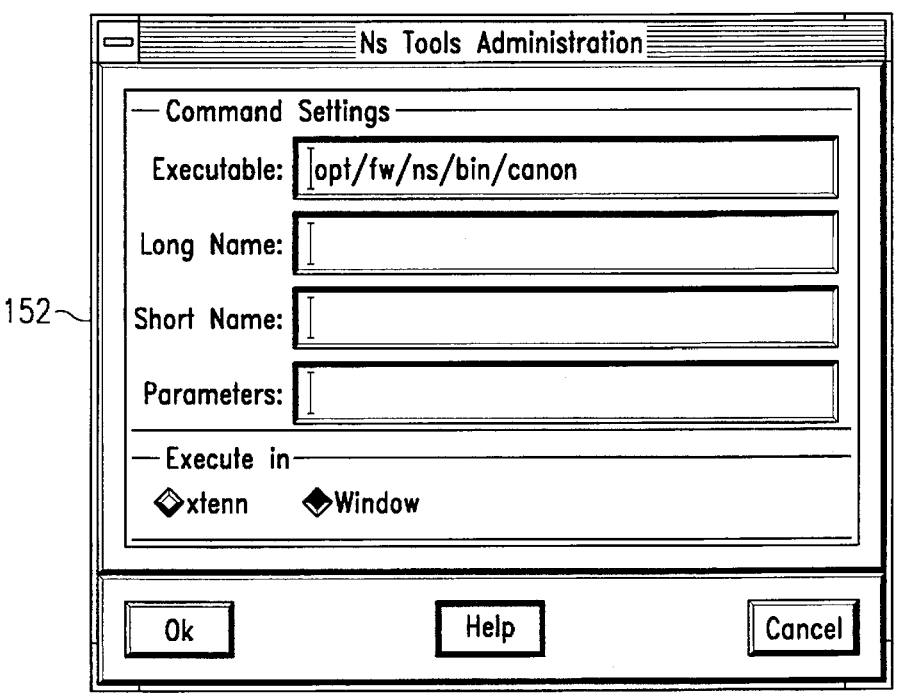

FIG. 7b illustrates a graphical user interface 150 which is used by the tool configuration system 128 to interact with a user to configure nameserver tests and thus add these tests to the configured tool list accessible by the nameserver test system 48. Using the commands shown in interface 150, the nameserver tool configuration system 128 allows a user to add, delete, modify the tool list managed by the test system 48. The interface 150 is accessed by invoking the Tools command button 140 discussed with reference to FIG. 7a previously. As tools are configured, they are added to the tool list display region shown in interface 150. A tool can be selected in the ns/bin display region in interface 150. If the Add command is then invoked, the tools administration interface 152 shown in FIG. 7c will be displayed.

The tools administration interface 152 allows for the entry of a long name, a short name and parameters for the executable selected in the previous steps. After the tool administration window is completed, the user may choose the Apply command to add the newly configured tool to the tool list. The executable field specifies the full executable path to invoke the tool application. The long name field describes the long name for the tool which will be display in the tool list box on the configuration interface 150. The short name field specifies a unique identifier for the tool. The names for test system 48 uses the short name to sort the tool list.

The nameserver administration system of the present invention provides for graphical interfaces for administering a nameserver database for testing the nameserver database using a variety of tools and for issuing queries to other nameservers.

Although the present invention and its advantages have been described in detail, it should be understood that various changes, substitutions and alterations can be made therein without departing from the spirit and scope of the invention as defined by the appended claims.

What is claimed is:

1. A data communications management system operating on a host computer system connected to a private network and operable to be connected to a public network, the system comprising:

a nameserver administration system providing a graphical user interface and operable to manage a local nameserver database comprising nameserver information which is accessible through queries issued from sites connected to the host computer system through the public network, the nameserver database further comprising local database information and may comprise a local cache of resolved nameserver operations, the graphical user interface associated with the nameserver administration system including a reload command which, when invoked, reinitializes the nameserver database and clears the local cache of resolved nameserver operations;

a nameserver test system providing a graphical user interface coupled to the nameserver database, the test system operable to execute tools invoked through the test system graphical user interface testing the configuration and operation of the nameserver database; and a nameserver query system providing a nameserver query graphical interface, the nameserver query system operable to issue queries through the public network to other nameserver host systems and to receive and display results of the queries through the nameserver query graphical user interface.

2. A data communications management system operating on a host computer system connected to a private network and operable to be connected to a public network, the system comprising:

a nameserver administration system providing a graphical user interface and operable to manage a local nameserver database comprising nameserver information which is accessible through queries issued from sites connected to the host computer system through the public network, the nameserver database further comprising local database information and may comprise a local cache of resolved nameserver operations, the graphical user interface associated with the nameserver administration system including a reload command which, when invoked, reinitializes the nameserver database and clears the local cache of resolved nameserver operations, the graphical user interface associated with the nameserver administration system comprising a dump command operable to display the contents of the nameserver database including the contents of the local cache of resolved nameserver operations;

a nameserver test system providing a graphical user interface coupled to the nameserver database, the test system operable to execute tools invoked through the test system graphical user interface testing the configuration and operation of the nameserver database; and a nameserver query system providing a nameserver query graphical interface, the nameserver query system operable to issue queries through the public network to other nameserver host systems and to receive and display results of the queries through the nameserver query graphical user interface.

3. A method of administering the nameserver database comprising the steps of:

providing a graphical user interface providing command buttons to a user of the graphical user interface;

displaying the information associated with the contents of the nameserver database including a local cache of resolved nameserver operations when a dump command is invoked through the graphical user interface;

reinitializing the nameserver database and clearing the local cache of resolved nameserver operations upon the invocation of a reload command through the graphical user interface;

displaying selective records responsive to type information selected using the graphical user interface in response to a command to view the selected records; and searching the database for records containing particular character strings specified by a user through the graphical user interface.

\* \* \* \* \*